(12) United States Patent
Okuno

(10) Patent No.: US 12,512,144 B2
(45) Date of Patent: Dec. 30, 2025

(54) CONTROL CIRCUIT AND SEMICONDUCTOR MEMORY DEVICE

(71) Applicant: Winbond Electronics Corp., Taichung (TW)

(72) Inventor: Shinya Okuno, Yokohama (JP)

(73) Assignee: WINBOND ELECTRONICS CORP., Taichung (TW)

( * ) Notice: Subject to any disclaimer, the term of this patent is extended or adjusted under 35 U.S.C. 154(b) by 121 days.

(21) Appl. No.: 18/519,679

(22) Filed: Nov. 27, 2023

(65) Prior Publication Data

US 2024/0233809 A1 Jul. 11, 2024

(30) Foreign Application Priority Data

Jan. 10, 2023 (JP) .................. 2023-001473

(51) Int. Cl.
*G11C 11/4076* (2006.01)
*G11C 11/4096* (2006.01)
*H03L 7/081* (2006.01)

(52) U.S. Cl.
CPC ...... *G11C 11/4076* (2013.01); *G11C 11/4096* (2013.01); *H03L 7/0818* (2013.01)

(58) Field of Classification Search
CPC ............ G11C 11/4076; G11C 11/4096; H03L 7/0818
USPC ...................................... 265/233.1
See application file for complete search history.

(56) References Cited

U.S. PATENT DOCUMENTS

2007/0046344 A1* 3/2007 Minzoni ............... H03L 7/0814
327/158

2009/0146712 A1 6/2009 Ma et al.
2017/0026216 A1 1/2017 Zhao

FOREIGN PATENT DOCUMENTS

| CN | 111066085 A | 4/2020 |
|---|---|---|
| JP | 2005-339597 A | 12/2005 |
| JP | 2013-222997 A | 10/2013 |
| JP | 2014-212365 A | 11/2014 |
| JP | 2015-35241 A | 2/2015 |
| TW | 201610993 A | 3/2016 |

OTHER PUBLICATIONS

Japanese Office Action for Japanese Application No. 2023-001473, dated Mar. 26, 2024, with an English translation.

* cited by examiner

*Primary Examiner* — Huan Hoang

(74) *Attorney, Agent, or Firm* — Birch, Stewart, Kolasch & Birch, LLP

(57) ABSTRACT

A control circuit includes a control unit, a delay line unit, and a detection unit. The delay line unit delays an input clock signal based on the delay amount and generates an output clock signal. The detection unit performs a detection operation to detect the number of delayed clock cycles from the input clock signal to the output clock signal. The control unit changes the delay amount during a delay operation and controls the delay line unit so that the input clock signal is synchronized with the output clock signal. Before the delay operation, the detection unit performs the detection operation multiple times and detects a plurality of numbers of delayed clock cycles. The control unit sets the delay amount for the detection operation and sets the delay amount for the delay operation according to plurality of detected numbers of delayed clock cycles.

15 Claims, 10 Drawing Sheets

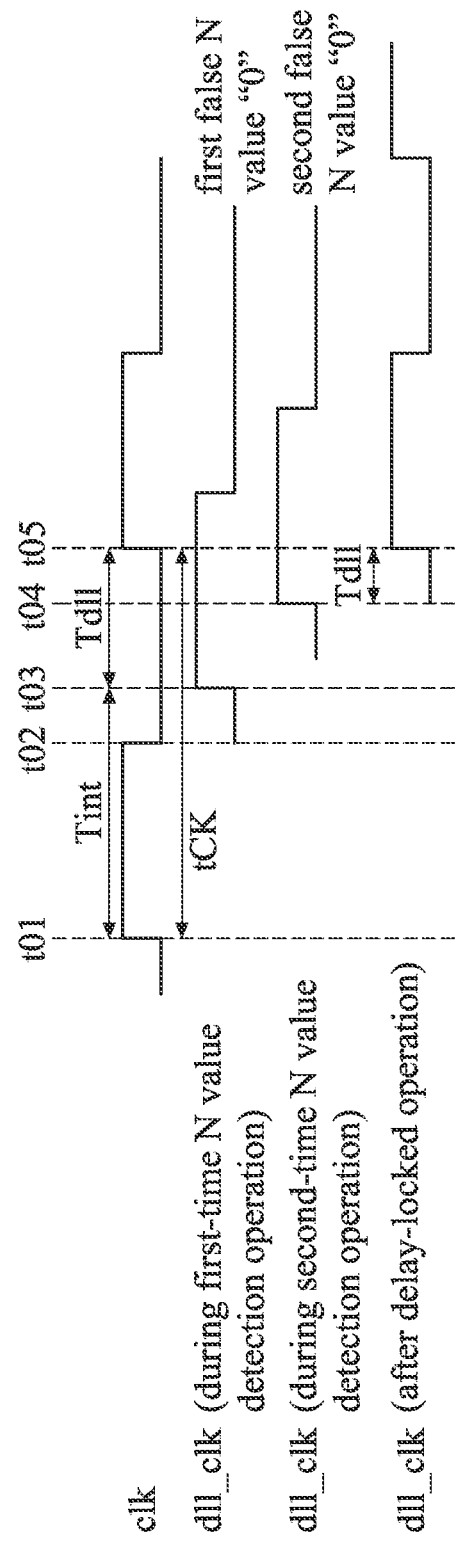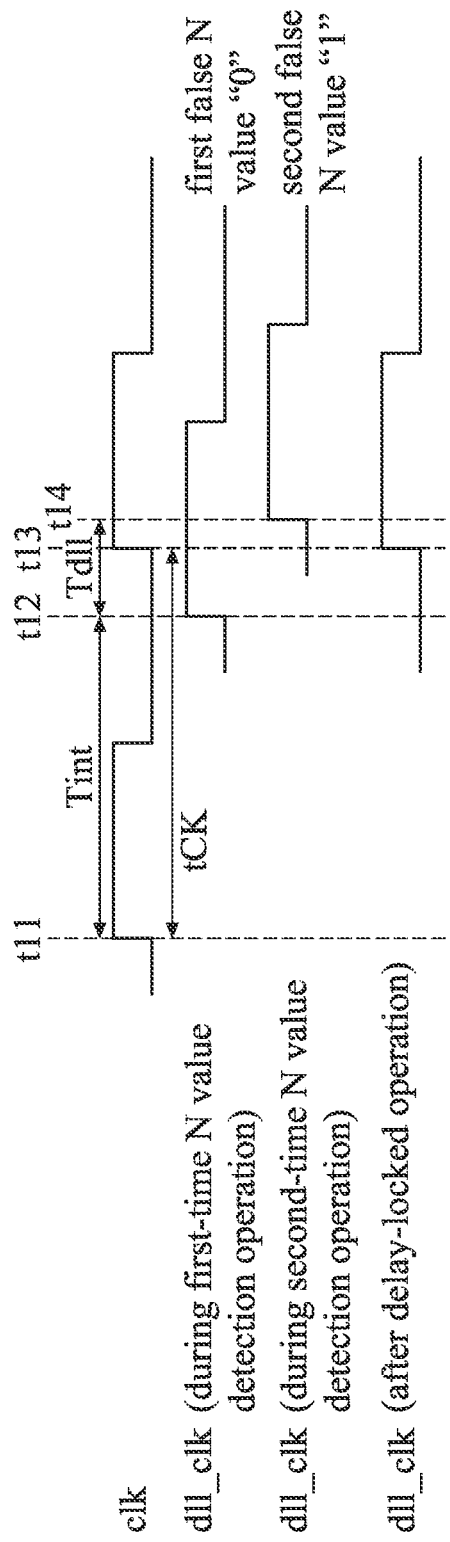
FIG. 2(A)
FIG. 2(B)

FIG. 3(A)

| first false N value | delay amount |
|---|---|
| 0 | 34 |
| 1 | 34 |
| 2 | 24 |
| 3 | 24 |
| 4 | 14 |
| 5 | 14 |
| 6 | 14 |
| 7 | 14 |

FIG. 3(B)

| | second false N value | | | | | | | |
|---|---|---|---|---|---|---|---|---|
| first false N value | | 0 | 1 | 2 | 3 | 4 | 5 | 6 | 7 |
| 0 | 34 | | | | | | | |
| 1 | 34 | 4 | | | | | | |
| 2 | | 24 | 4 | | | | | |
| 3 | | | 24 | 4 | | | | |
| 4 | | | | 24 | 4 | | | |
| 5 | | | | | 14 | 4 | | |
| 6 | | | | | | 14 | 4 | |
| 7 | | | | | | | 14 | 4 |

|  |  | first-time N value detection | second-time N value detection | third-time N value detection |
|---|---|---|---|---|
| first false N value | 0 | 4 | 34 | 64 |
|  | 1 | 4 | 34 | 64 |
|  | 2 | 4 | 24 | 44 |
|  | 3 | 4 | 24 | 44 |
|  | 4 | 4 | 14 | 24 |
|  | 5 | 4 | 14 | 24 |
|  | 6 | 4 | 14 | 24 |
|  | 7 | 4 | 14 | 24 |

FIG. 9(A)

first false N value ≠ second false N value

|  |  | second false N value | | | | | | | |
|---|---|---|---|---|---|---|---|---|---|
|  |  | 0 | 1 | 2 | 3 | 4 | 5 | 6 | 7 |
| first false N value | 0 |  | 4 |  |  |  |  |  |  |
|  | 1 |  |  | 4 |  |  |  |  |  |
|  | 2 |  |  |  | 4 |  |  |  |  |
|  | 3 |  |  |  |  | 4 |  |  |  |
|  | 4 |  |  |  |  |  | 4 |  |  |
|  | 5 |  |  |  |  |  |  | 4 |  |
|  | 6 |  |  |  |  |  |  |  | 4 |
|  | 7 |  |  |  |  |  |  |  |  |

FIG. 9(B)

first false N value = second false N value

|  |  | third false N value | | | | | | | |
|---|---|---|---|---|---|---|---|---|---|
|  |  | 0 | 1 | 2 | 3 | 4 | 5 | 6 | 7 |
| second false N value | 0 | 64 | 34 |  |  |  |  |  |  |
|  | 1 |  | 64 | 34 |  |  |  |  |  |
|  | 2 |  |  | 44 | 24 |  |  |  |  |
|  | 3 |  |  |  | 44 | 24 |  |  |  |
|  | 4 |  |  |  |  | 24 | 14 |  |  |
|  | 5 |  |  |  |  |  | 24 | 14 |  |
|  | 6 |  |  |  |  |  |  | 24 | 14 |
|  | 7 |  |  |  |  |  |  |  | 24 |

FIG. 9(C)

CONTROL CIRCUIT AND SEMICONDUCTOR MEMORY DEVICE

CROSS REFERENCE TO RELATED APPLICATIONS

This Application claims priority of Japan Patent Application No. JP 2023-001473, filed on Jan. 10, 2023, the entirety of which is incorporated by reference herein.

BACKGROUND OF THE INVENTION

Field of the Invention

The present invention relates to a control circuit and a semiconductor memory device.

Description of the Related Art

A DRAM (Dynamic Random Access Memory, DRAM) is provided with a delay locked loop DLL) circuit as a phase synchronization circuit. The DRAM uses the DLL circuit to generate an internal clock signal for outputting a data signal and synchronizes the internal clock signal with an input clock signal that is input from the outside. (Prior technical document: JP 2015-035241 A)

When a DLL circuit is used to adjust the delay of an internal clock signal, the following operations will be performed: reset of the DLL circuit, delay (locking) of the DLL circuit (the operation that makes each delay line active and, at the same time, synchronizes the external clock with the internal clock), and the detection of a value N. The value N represents the number of delayed clock cycles between the input clock signal and the internal clock signal. Here, the locking time Tdll caused by the delay operation of the DLL circuit can be expressed by the following formula:

$$\text{Tint} + Tdll = NxtCK$$

In the above formula, Tint represents the existing delay time in the DDL circuit, and tCK represents the clock cycle. For example, when the temperature in the semiconductor memory device causes the clock cycle (tCK) to be longer than the existing delay time (Tint), as shown in the above formula, the locking time (Tdll) caused by the delay operation of the DLL circuit is also extended. If the locking time is extended in this way, the overall execution time of the above-mentioned program will become longer and may exceed the program execution period (tDLLK) that was previously set.

BRIEF SUMMARY OF THE INVENTION

An exemplary embodiment of the present invention provides a control circuit. The control circuit comprises a control unit, a delay line unit, and a detection unit. The control unit operates to set a delay amount. The delay line unit operates to delay an input clock signal based on the delay amount and generate an output clock signal. The detection unit operates to perform a detection operation. The detection operation is performed to detect the number of delayed clock cycles from the input clock signal to the output clock signal. The control unit is a control circuit that changes the delay amount during a delay operation and controls the delay line unit so that the input clock signal is synchronized with the output clock signal. Before the delay operation is performed, the detection unit performs the detection operation multiple times and detects a plurality of numbers of delayed clock cycles. In response to the detection operation being performed multiple times, the control unit sets the delay amount for the detection operation and sets the delay amount for the delay operation according to the plurality of detected numbers of delayed clock cycles.

According to the control circuit and the semiconductor memory device of the present invention, prolongation of the delay operation can be prevented, and the adjustment procedure in which an internal clock signal is delayed a DLL circuit can be completed within a predetermined execution period.

BRIEF DESCRIPTION OF THE DRAWINGS

The present invention can be more fully understood by reading the subsequent detailed description and examples with references made to the accompanying drawings, wherein:

FIGS. 2(A) and 2(B) are schematic diagrams showing relationship between an input clock signal and delay time in the first embodiment;

FIGS. 3(A) and 3(B) are schematic diagrams showing table data of a control unit in the first embodiment;

FIGS. 8(A) and 8(B) are schematic diagrams showing respective states of a present program in the second embodiment and a conventional program;

FIGS. 9(A)-9(C) are schematic diagrams showing table data of a control unit in the second embodiment.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
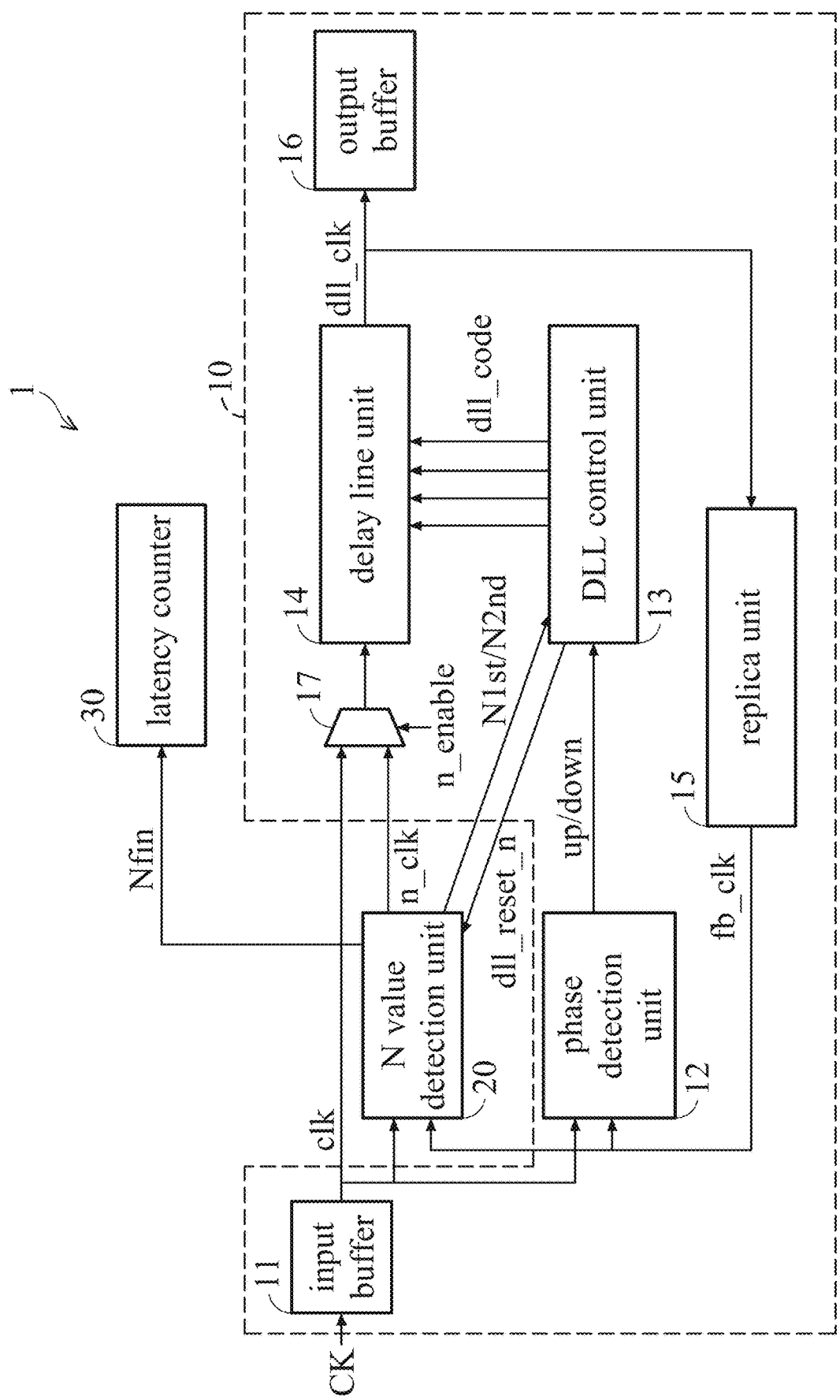
FIG. 1 is a schematic block diagram of a structure of a control circuit of the first embodiment.

FIG. 1 shows an example of a structure of a control circuit according to an embodiment of the present invention. A control circuit 1 comprises a DLL circuit 10, an N value detection unit 20, and a latency counter 30. In the embodiment, the control circuit 1 is provided in a semiconductor memory device such as a DRAM. In addition, in order to simplify the description, the conventional components (for example, an instruction decoder, a memory cell array, an interface unit for input and output, etc.) in a semiconductor memory device, such as a DRAM, are not illustrated.

The DLL circuit 10 comprises an input buffer 11, a phase detection unit 12, a DLL control unit 13, a delay line unit 14, a replica unit 15, an output buffer 16, and a multiplexer 17.

The input buffer 11 buffers an external clock signal CK that is input to the input buffer 11 and generates an input clock signal clk. The generated input clock signal clk is transmitted to the N value detection unit 20 and the phase detection unit 12 and then transmitted to the delay line unit 14 through the multiplexer 17. The delay line unit 14 delays the input clock signal clk or a signal n_clk to generate a delay signal dll_clk and transmits the delay signal dll_clk to the output buffer 16 and the replica unit 15. The signal n_clk is a signal that is generated during an N value detection operation and synchronized with the input clock signal clk. The replica unit 15 generates a feedback signal fb_clk according to the input delay signal dll_clk and outputs it to the N value detection unit 20 and the phase detection unit 12.

The phase detection unit 12 detects the phase difference between the input clock signal clk and the feedback signal fb_clk. The input clock signal clk is input to the phase detection unit 12, and the feedback signal fb_clk is input to the phase detection unit 12 at the same time. The phase detection unit 12 generates a phase signal up/down and inputs it to the DLL control unit 13. The phase signal up/down indicates whether the phase of the feedback signal fb_clk is leading or lagging relative to the input clock signal clk.

The DLL control unit 13 determines a delay amount and generates a control signal dll_code composed of a plurality of bits as a signal indicating the delay amount. The DLL control unit 13 inputs the control signal dll_code to the delay line unit 14. In addition, when the phase difference indicated by the phase signal up/down converges to a predetermined range, that is, when the input clock signal clk is synchronized with the feedback signal fb_clk corresponding to the delay signal dll_clk, the DLL control unit 13 ends the delay operation. In addition, the DLL control unit 13 is an example of the "control unit" of the present invention.

The delay line unit 14 is a variable delay unit. Each time the DLL control unit 13 sets the delay amount, the delay line unit 14 activates the delay line(s) based on the control signal dll_code that indicates the delay amount, thereby delaying the input clock signal clk and generating the delay signal dll_clk.

In the embodiment, the so-called "delay amount" corresponds to the number of activated delay lines among at least one delay line of the delay line unit 14. If the delay amount is greater, the number of bits with a high level in the control signal dll_code is greater (the more delay lines are activated), and the delay time of the delay signal dll_clk relative to the input clock signal clk is longer.

When a control signal n_enable with a high level is input to the multiplexer 17, the signal n_clk is input to the delay line unit 14, otherwise, the input clock signal clk is input to the delay line unit 14. That is, during the N value detection operation, the delay line unit 14 performs the signal n_clk based on the delay corresponding to the control signal dll_code from the DLL control unit 13 and generates the delay signal dll_clk. In addition, since the signal n_clk corresponds to the input clock signal clk, the signal n_clk is sometimes also referred to as the input clock signal clk in the description of this embodiment in order to facilitate understanding of the invention.

A reset signal that is not shown (a signal for starting the delay operation) is input to the DLL circuit from a predetermined circuit (not shown), and the DLL circuit enters a DDL reset state. When the DLL reset state ends, the DLL control unit 13 generates a control signal dll_reset_n with a high level and inputs it to the N value detection unit 20. By inputting the high-level control signal dll_reset_n, the N value detection unit 20 will perform the N value detection operation described later.

The N value detection unit 20 performs the N value detection operation. The N value detection operation is performed to detect an N value from the input clock signal clk and the feedback signal fb_clk. In addition, the N value detection unit 20 is an example of the "detection unit" of the present invention.

Here, the N value is a value represented by Tint (the existing delay time in the DLL circuit)+Tdll (locking time caused by the delay operation of the DLL circuit)=N×tCK, which means the number (it is an integer)) of delayed clock cycles from the input clock signal clk suffering the delay operation of the DLL circuit 10 to the feedback signal fb_clk (the output clock signal) that is generated based on the delay signal dll_clk. In the prior art, the N value detection unit 20 detects the N value after the delay operation. However, in the embodiment, the N value detection unit 20 does not perform an N value detection after the delay operation but performs the N value detection operation several times before the delay operation. The DLL control unit 13 controls the delay line unit 14 based on a plurality of false N values (hereinafter referred to as "false N values") obtained by performing the value N detection operation several times before the delay operation. That is, one false N value obtained by the N value detection operation in the embodiment is the number of delayed clock cycles from the input clock signal clk suffering the N value detection operation before the delay operation to the feedback signal fb_clk that is generated based on the delay signal dll_clk.

In the embodiment, the N value detection unit 20 performs the N value detection operations twice before the delay operation is performed and then detects the first false N value and the second false N value. When the input control signal dll_reset_n indicates the end of the reset operation at the high level, the N value detection unit 20 detects the number of delayed clock cycles from the signal n_clk to the feedback signal fb_clk as a false N value and inputs a first false N value signal N1st and a second false N value signal N2nd to the DLL control unit 13 for the N value detection operation.

The first false N value and the second false N value are not the N value itself. However, because the N value is the number of delayed clock cycles from the signal n_clk in the N value detection operation to the feedback signal fb_clk, when the clock cycle tCK is longer, the false N value is smaller. Therefore, when the false N value is small, it can be understood that the locking time Tdll will be prolonged. The DLL circuit 10 predicts whether the locking time Tdll will be prolonged based on the first false N value and the second false N value detected before the delay operation if the delay operation is performed in this way. If it is predicted that the locking time Tdll will be prolonged, the initial delay amount of the delay line unit 14 for the delay operation is set greater, thereby shortening the locking time Tdll. Here, the so-called "initial delay amount" refers to the delay amount at the start of the delay operation.

FIGS. 2(A) and (B) are provided for specific explanation. FIG. 2(A) shows a situation that in the prior art, the delay operation may be prolonged due to the relatively-long clock period of the input clock signal clk.

First, the N value detection unit 20 detects the first false N value through the N value detection operation that is performed for the first time (referred to as "the first-time N value detection operation") before the delay operation, and the DLL control unit 13 sets the delay amount for the N value detection operation that will be performed next time according to this value. Specifically, in the first-time N value detection operation, the DLL control unit 13 sets the delay amount as a reference delay amount, and the delay line unit 14 activates the delay line or lines based on the delay amount, delays the input clock signal clk, and generates the delay signal dll_clk. Here, the so-called "reference delay amount" refers to the delay amount that is previously set by the DLL control unit 13 before the N value detection operation. In the embodiment, the minimum reference delay amount is set to "4". The N value detection unit 20 detects the number of delayed clock cycles between the input clock signal clk and the generated delay signal dll_clk based on the input clock signal and the delay amount "4" as the first false N-value.

The setting of the delay amount that is performed by the DLL control unit 13 based on the first false N value is based on the table data shown in FIG. 3(A). The table data in FIG. 3(A) shows the respective delay amounts corresponding to the first false N value. If the first false N value is smaller, the delay amount for the N value detection operation that will be performed for the second time (referred to as "the second-time N value detection operation") is set to be greater than the reference delay amount. For example, if the first false N value is 0, the delay amount is set to "34" that is much greater than the reference delay amount "4"; if the first false N value is 4 or more, the delay amount is set to "14" that is slightly greater than the reference delay amount "4". Here, the delay amount set corresponding to the false N value is previously set to a value that is smaller than the maximum delay amount required to eliminate the delay predicted for each false N value. This is because if the delay amount corresponding to the false N value is greater than or equal to the required maximum delay amount predicted for each false N value, the initial delay amount for the delay-locked operation in the embodiment cannot be appropriately set.

The delay line unit 14 activates the delay line or lines based on the delay amount that is set by the DLL control unit 13 in such way. In the case shown in FIG. 2(A), the first false N value is 0 for the first-time N value detection operation. Thus, the DLL control unit 13 sets the delay amount for the second-time N value detection operation to "34".

Next, the N value detection unit 20 performs the second-time N value detection operation. At this time, since the DLL control unit 13 sets the delay amount to "34", compared with the first N value detection operation, the delay signal dll_clk is delayed by the delay amount "34" from the time of the first-time N value detection operation. In this state, the N value detection unit 20 detects the number of delayed clock cycles between the input clock signal clk and the output clock signal dll_clk as the second false N value.

If the locking time is prolonged (that is, tCK is very great) and the delay amount is also great, it can be understood that the second false N value corresponding to the output clock signal delayed by the delay amount set by the first false N value will be the same as the 1st false N values. Therefore, the N value detection unit 20 determines whether the second false N value is the same as the first false N value.

If the second false N value is the same as the first false N value, the DLL control unit 13 sets the initial delay amount for the delay-locked operation as the delay amount that is set when the second false N value is detected. When the delay-locked operation set in this way is performed, since the initial delay amount is greater than the reference delay amount, the delay amount required to eliminate the delay can be reached as early as possible, and the delay-locked operation can be completed in a short time period, thereby allowing the procedure to be terminated within a predetermined period (tDLLK). Then, in the procedure, the DLL control unit 13 takes the second false N value plus 1 as the N value and inputs it to the latency counter without performing the N value detection operation for another time. The determination of the DLL control unit 13 is shown in the table data shown in FIG. 3(B).

In the case of FIG. 2(B), the first false N value is 0 during the first-time N value detection operation, and the second false N value detected by the N value detection unit 20 is also 0. In this way, the first false N value is the same as the second false N value. Therefore, the table data shown in FIG. 3(B), the DLL control unit 13 sets the initial delay amount of the delay-locked operation to the delay amount that is set when the second false N value is detected, that is, "34". Accordingly, the delay amount can be increased by only "10" from "34" to "44", and the delay-locked operation becomes shorter than the prior art.

In other words, according to the original view, the locking time Tdll is from the time t03 of the rising edge of the delay signal dll_clk in the first-time N value detection operation to the time t05 of the rising edge of the input clock signal clk. At the beginning of the delay-locked operation, since the initial delay amount is greater than the reference delay amount, the delay signal dll_clk is delayed. Therefore, the actual locking time Tdll is from the time t04 of the rising edge of the output clock signal dll_clk in the second-time N value detection operation to the time t05 of the rising edge of the input clock signal clk, and the locking time Tdll is thus shortened.

On the other hand, if the second false N value is different from the first false N value, the DLL control unit 13 uses the reference delay amount (that is, the delay amount in the first-time N value detection operation) as the delay amount for the delay-locked operation. In this case, even if the clock cycle tCK is sufficiently long, the delay amount is not increased, and the delay-locked operation is not prolonged, so there is no need to increase the initial delay amount for the delay-locked operation. In this case, the DLL circuit 10 of the present embodiment can finish the procedure within the predetermined period (tDLLK) even if the delay-locked operation starts from the reference delay amount. In addition, in this case, the DLL control unit 13 takes the second false N value as the N value and inputs it to the latency controller, and, similarly, there is no N value detection operation performed additionally.

Although the above-mentioned clock cycle tCK shown in FIG. 2(B) is sufficiently long, the delay amount does not become greater, and the delay-locked operation is not prolonged. In the case of FIG. 2(B), the N value detection unit 20 detects that the first false N value is 0 during the first-time N value detection operation. The DLL control unit 13 sets the delay amount to "34" from the reference delay amount "4" according to the first false N value in this case by referring to the table data in FIG. 3(A), and the delay line unit 14 activates the delay line or lines based on the set delay amount "34". However, when the N value detection unit 20 performs the second-time N value detection operation, the phase of the output clock signal dll_clk that is delayed by the set delay amount moves forward, the number of delayed clock cycles between the input clock signal clk and the output clock signal dll_clk is equal to "1", and the second false N value is equal to "1". In this way, the first false N value is different from the second false N value. Therefore, the DLL control unit 13 sets the initial delay amount of the delay-locked operation to "4". In this case, the locking time Tdll is from the time t12 of the rising edge of the output clock signal dll_clk to the time t14 of the rising edge of the input clock signal clk during the first-time N value detection operation. Thus, in this case, the same control can be performed as the prior art.

Figures 4A, 4B:
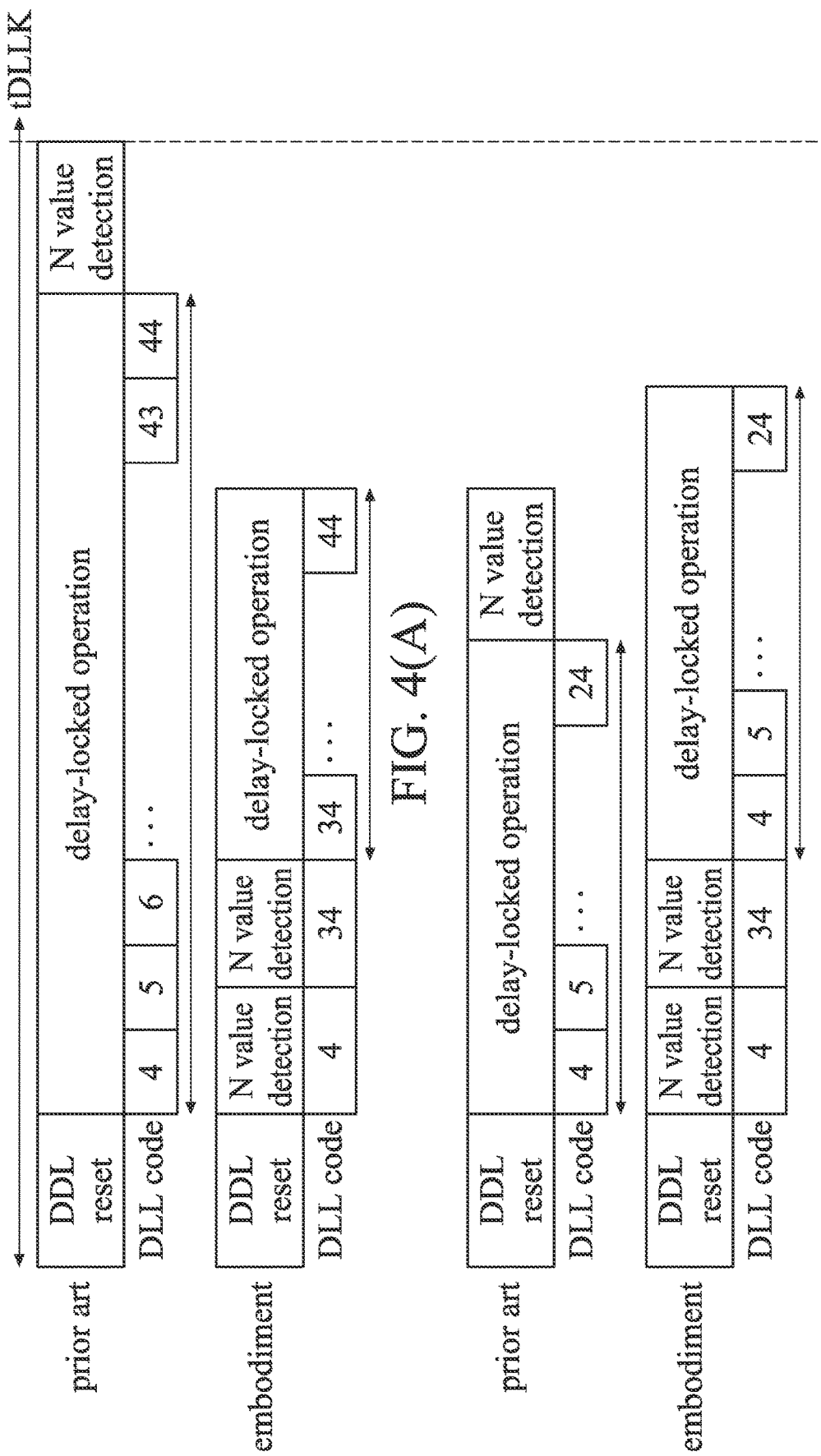
FIGS. 4(A) and 4(B) are schematic diagrams showing respective states of a present program of the first embodiment and a conventional program.

This case will be described in detail as a whole procedure using FIGS. 4(A) and (B). FIG. 4(A) shows that the clock cycle tCK of the input clock signal clk is relatively long, and the delay amount is relatively great, which is the case shown in FIG. 2(A). In such a case, the prior art is to perform a delay-locked operation after a DLL reset and perform an N value detection operation finally. Then, in this case, since the initial delay amount for the delay-locked operation is set to "4" that is the reference delay amount. Therefore, even though the delay amount is great, the delay-locked operation is still performed to increase the delay amount by one "1" gradually, and the delay-locked operation continues until the delay amount becomes "44". Therefore, the locking time takes a time equivalent to the delay amount "40", and the delay-locked operation is thus prolonged.

In contrast, in the embodiment, after the DLL reset, the N value detection operation is performed twice to detect the first false N value and the second false N value, and the initial delay amount of the delay-locked operation is set as "34". In this case, even though the delay-locked operation continues until the delay amount becomes "44", the locking time is only equivalent to the delay amount "10". The time spent on the delay-locked operation of the embodiment is a quarter of that of the prior art and, thus, is shortened. Therefore, in the embodiment, the time tDLLK of the whole procedure can also be shortened accordingly.

FIG. 4(B) shows that the clock cycle tCK of the input clock signal clk is relatively long, and the delay amount is relatively small, which is the case shown in FIG. 2(B). In such a case, the prior art also performs the delay-locked operation after DLL reset and then performs the N value detection operation finally. However, because the delay amount is smaller, the delay amount for the delay-locked operation is only equivalent to the delay amount "20" from "4" to "24" that is relatively short. In contrast, in the embodiment, the N value detection operation is performed twice, and after the first false N value and the second false N value are detected, the delay-locked operation continues from the reference delay amount "4" serving as the initial delay amount to "24". In this case, the locking time is also equivalent to the delay amount "20", and the time spent on the delay-locked operation has not changed compared with the prior art. In addition, in the embodiment, for the whole procedure, the time required for the second-time N value detection operation will be longer than time taken the prior art through performing the N value detection operation twice. Since the delay-locked operation takes a relatively short time, there is no possibility that the whole procedure exceeds the predetermined period (tDLLK), which does not cause problems.

In the embodiment, the N value detection unit 20 can perform the N value detection operations for several times before the delay-locked operation is performed and further detect a plurality of false N values. The DLL control unit 13 can appropriately set the initial delay amount for the delay-locked operation to be greater in advance according to the false N values. Thus, the locking time can be shortened.

Figure 5:
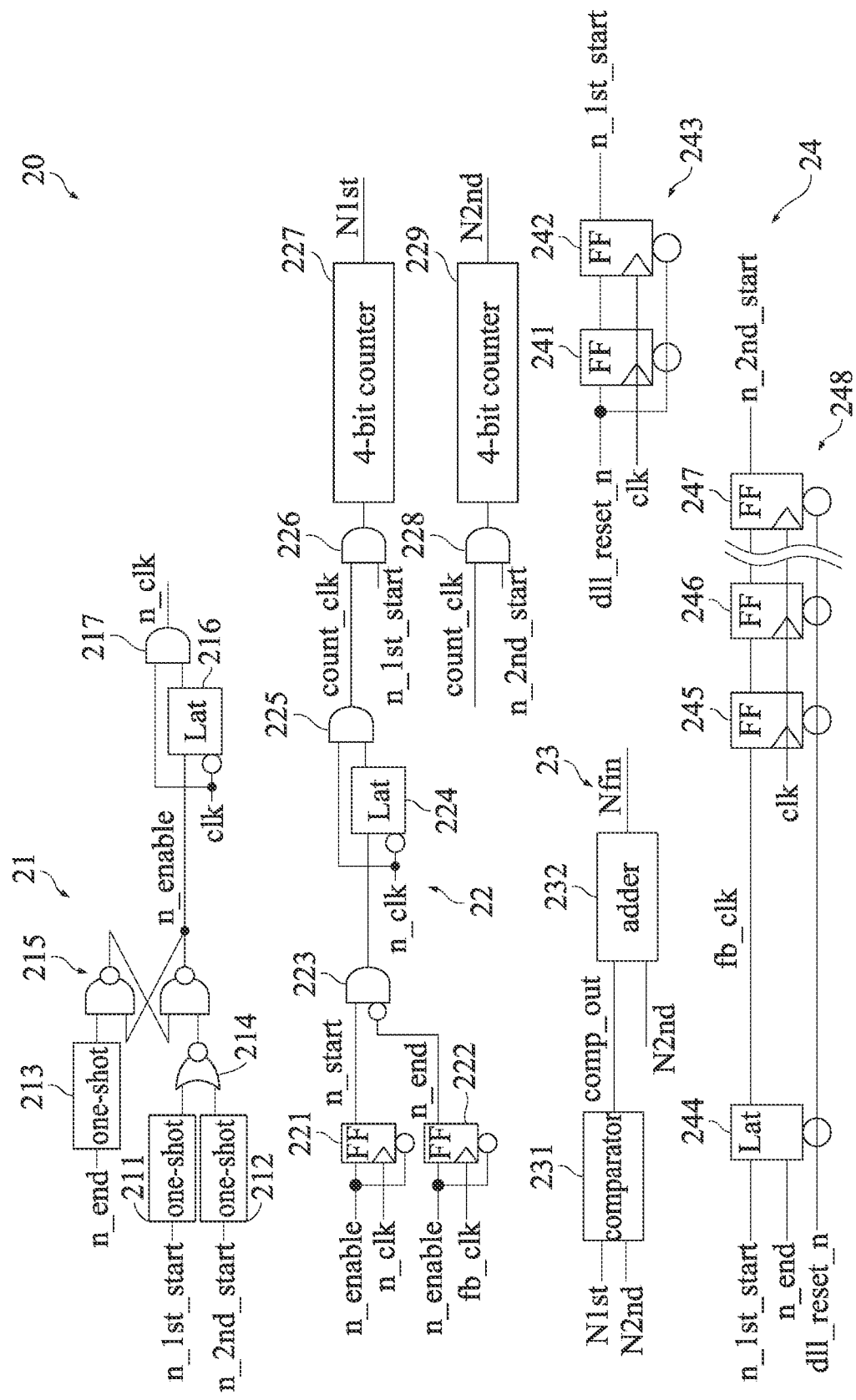
FIG. 5 is a schematic diagram showing a structure of a value N detection unit in the first embodiment.

The structure of the N value detection unit 20 is described in detail with reference to FIG. 5. The N value detection unit 20 comprises a signal n_clk generating unit 21, an N value counting unit 22, an N value determination unit 23, and a start signal generation unit 24. First, the start signal generation unit 24 will be described.

The start signal generation unit 24 comprises and a first start signal generation unit 243 and a second start signal generation unit 248. The first start signal generation unit 243 comprises flip-flop (D-FF) circuits (FF) 241 and 242. The second start signal generation unit 248 comprises a latch circuit (Lat) 244 and flip-flop device (FF) circuits 245-247. The first start signal generation unit 243 generates a start signal n_1st_start, and the rising edge of the start signal n_1st_start switching to a high level from a low level indicates the time point when the first-time N value detection operation starts. The second start signal generation unit 248 generates a start signal n_2nd_start, and the rising edge of the start signal n_2nd_start switching to a high level from a low level indicates the time point when the second N value detection operation starts.

The first start signal generation unit 243 inputs the clock signal clk as a clock signal to each of the D-FF circuits 241 and 242. The D-FF circuit 241 receives the control signal dll_reset_n as an input signal, and the D-FF circuit 242 receives the output signal from the D-FF circuit 241 on the upstream side as an input signal. The control signal dll_reset_n is also input to the D-FF circuits 241 and 242, respectively. When the control signal dll_reset_n with the high level is input, the D-FF circuits 241 and 242 of the first start signal generation unit 243 generate the start signal n_1st_start with a high level in synchronization with the input clock signal clk.

In the first start signal generation unit 243, the input clock signal clk is input to each of the D-FF circuits 241 and 242 as a clock signal. The control signal dll_reset_n is input to the D-FF circuit 241 as an input signal, and the output signal from the upstream-side D-FF circuit is input to the D-FF circuit 242 as an input signal. In addition, the control signal dll_reset_n is also input to the D-FF circuits 241 and 242 respectively. In the first start signal generating unit 243, when the control signal dll_reset_n is input at the high level, the D-FF circuits 241 and 242 are synchronized with the input clock signal clk to generate the start signal n_1st_start at a high level.

In the second start signal generating unit 248, the start signal n_1st_start and a signal n_end are input to the latch circuit 244. When the signal n_end is switched to a high level, the feedback signal fb_clk is output, which means that the N value detection operation ends. The output signal of the latch circuit 244 is input to the D-FF circuit 245. The input clock signal clk is input to each of the D-FF circuits 245-247 as a clock signal. In addition, the D-FF circuits 245-247 are implemented by a plurality of D-FF circuits connected in series. However, in the embodiment of FIG. 5, part of the D-ff circuits shown in FIG. 5 can be omitted, and, for example, only the D-FF circuits 245-247 are shown. In addition, the outputs from the D-FF circuits 245 and 246 on the upstream side are input to D-FF circuits 246 and 247, respectively.

In the second start signal generation unit 248, when the signal n_end is switched to the high level, the held start signal n_1st_start is output from the latch circuit 244 and sequentially input to the D-FF circuits 245-247 in synchronization with the input clock signal clk. After a predetermined time, the held start signal n_1st_start is output as a start signal n_2nd_start. That is, when the signal n_end is input at the high level, the high level of the start signal n_2nd_start indicates the time point at which the second-time N value detection operation starts after the predetermined time. In the embodiment, the reason why the second-time N value detection operation starts after the predetermined time is to not start the second-time N value detection operation until the control signal dll_code is changed to change the delay line or lines in the delay line unit 14.

The signal n_clk generating unit 21 comprises first to third one-shot circuits (one-shot) 211-213, a NOR circuit 214, a flip-flop circuit 215, a first latch circuit 216, and a first AND circuit 217. The N value counting unit 22 comprises two D-flip-flop (D-FF) circuits 221 and 222, a second AND circuit 223, a second latch circuit 224, a third AND circuit 225, a fourth AND circuit 226, a first 4-bit counter 227, a fifth AND circuit 228, and a second 4-bit counter 229.

Only when the N value is detected, the signal n_clk generation unit 21 generates the signal n_clk that corresponds to the input clock signal clk and comprises pulses. In the signal n_clk generation unit 21, the start signal n_1st_start is input to the first one-shot circuit 211, the start signal n_2nd_start is input to the second one-shot circuit 212. The respective outputs of the first one-shot circuit 211 and second one-shot circuit 212 are input to the NOR circuit 214.

The signal that is output from the NOR circuit 214 and the signal that is output by the third one-shot circuit 213 according to the signal n_end output are input to the flip-flop circuit 215, and the control signal n_enable is generated by the flip-flop circuit 215. The high level of the control signal n_enable means that the N value detection operation can be performed. The generated control signal n_enable is input to the first latch circuit 216. The input clock signal clk is input to the first latch circuit 216 as a clock signal. The signal output from the first latch circuit 216 and the input clock signal clk are input to the first AND circuit 217, and the signal n_clk is output from the first AND circuit 217.

During the N value detection operation, the N value counting unit 22 counts the number of clock cycles of the input clock signal clk during the period from the inputting of the input clock signal clk to the generation of the feedback signal fb_clk, thereby detecting a false N value. In the N value counting unit 22, the signal n_clk and the control signal n_enable are input to the first D-FF 221 to generate a signal n_start. In addition, the feedback signal fb_clk corresponding to the delay signal dll_clk and the control signal n_enable are input to the second D-FF 22 to generate the signal n_end. The signal n_start is switched to a high level when the N value detection operation starts, and the signal n_end is switched to the high level when the N value detection operation ends.

The signal n_start and the signal n_end are input to the second AND circuit 223, and the output of the second AND circuit 223 is input to the second latch circuit 224. In addition, the signal n_clk is input to the second latch circuit 224 as a clock signal. The output from the second latch circuit 224 and the signal n_clk are input to the third AND circuit 225, and the third AND circuit 225 outputs a signal count_clk that is referred to as an N value counting signal. The number of pulses contained in the signal count_clk is equivalent to a false N value. The signal count_clk is input to the fourth AND circuit 226. The start signal n_1st_start is also input to the fourth AND circuit 226 for AND operation. In this way, the clock signal that corresponds to the false N value in the first N value detection operation and comprises pulses is input to the first 4-bit counter 227 from the fourth AND circuit 226. The first 4-bit counter 227 counts the pulses of its input signal to detect the false N value in the first N value detection operation. The first 4-bit counter 227 outputs a first false N value signal N1st. The first false N value signal N1st indicates the first false N value, that is, the false N value in the first N value detection operation.

In addition, the signal count_clk is input to the fifth AND circuit 228, and the start signal n_2nd_start is also input to the fifth AND circuit 228 for AND operation. In this way, the clock signal that corresponds to the false N value in the second N value detection operation and comprises pulses is input to the second 4-bit counter 229. The second 4-bit counter 229 counts the pulses of its input signal to detect the false N value in the second N value detection operation. The second 4-bit counter 229 outputs a second false N value signal N2nd. The second false N value signal N2nd indicates the second false N value, that is, the false N value in the second N value detection operation.

The first false N value signal N1st and the second false N value signal N2nd are input to the DLL control unit 13. In addition, it can also be designed such that when the control signal dll_reset_n is input at a low level, the values of the first 4-bit counter 227 and the second 4-bit counter 229 will be reset to an initial value (for example, 0); when the control signal dll_reset_n is input at the high level, new count is started.

The N value counting unit 22 counts the number of clock cycles (pulses) of the signal count_clk during the period from the inputting of the signal n_clk corresponding to the input clock signal clk to the inputting of the feedback signal fb_clk corresponding to the delay signal dll_clk, and the obtained number serves as the number of delayed clock cycles for performing the N value detection operation.

In addition, the first false N value signal N1st and the second false N value signal N2nd are also input to the N value determination unit 23. The N value determination unit 23 comprises a comparator (comp) 231 and an adder 232. The first false N value signal N1st and the second false N value signal N2nd are input to the comparator 231. According to the operation of the comparator 231, if the first false N value signal N1st is the same as the second false N value signal N2nd, the signal comp_out output from the comparator 231 is at a high level; if these input signals are different, the signal comp_out output from the comparator 231 is a low level. The signal comp_out is input to the adder 232. In addition, the second false N value signal N2nd is further input to the adder 232, and the adder 232 performs an addition operation on the signal comp_out and the second false N value signal N2nd to output a N value signal Nfin. That is, in the N value determining unit 23, for the second false N value signal N2nd, if the first false N value and the second false N value are equal the second false N value plus "1" serves as the N value and is output, if the first false N value is not equal to the second false N value, the second false N value serves as the N value and is output. The output N-value signal Nfin is provided to the latency counter 30.

The N value determination unit 23 can determine the N value based on the first false N value and the second false N value and output the determined N value, without the N value detection performed by the DLL circuit. In this case, the N value detection operations is performed several times, the delay amount is changed based on the false N values that are detected during the N value detection operation performed several times, and the changed delay amount is used to perform the N value detection operations several times, thereby setting a better delay amount. In addition, if the N values that are detected by the N value detection operation performed several times are the same, then the initial delay amount for the delay-locked operation is set according to the false N value that is detected by the last N value detection operation, thereby setting a better delay amount. In addition, if the N values that are detected by the N value detection operation performed several times are different, the initial delay amount for the delay-locked operation is set according to the false N value that is detected by the last N value detection operation, thereby setting a better delay amount.

Referring to FIG. 1, the latency counter 30 synchronizes the internal clock generated by the DLL circuit 10 and counts the latency. In addition, the latency counter 30 uses the N value signal Nfin that is detected by the N value detection unit 20 and indicates the N value to perform the latency counting. For example, if it is CAS (Column Address Strobe) latency, then the set latency indicates the number of clock cycles presented during the period from the time when a the command (for example, leading command) is input to the semiconductor memory device (DRAM) to the time when the data (For example, read data) is output from the semiconductor memory device. In this case, when the reset signal is input to the DLL circuit 10, the latency counter 30, for example, subtracts an amount equivalent to the N value from the CAS latency value set in the mode register (not shown) for the counting operation. As a specific example, if the value of the CAS latency is 10 and the N value is 1, the latency counter 30 counts 9 clock cycles that is the result of the subtraction operation. In addition, the N value detection unit 20 may output the N value signal Nfin to the latency counter 30 at regular intervals, or may output the N value signal Nfin to the latency counter 30 when the N value detection state ends. The latency counter 30 will use the N value signal Nfin to perform the counting of the latency after a predetermined period (tDLLK), so as long as the N value is input from the N value detection unit 20 before the predetermined period (tDLLK), the counting of the latency time can be performed appropriately.

Figure 6:
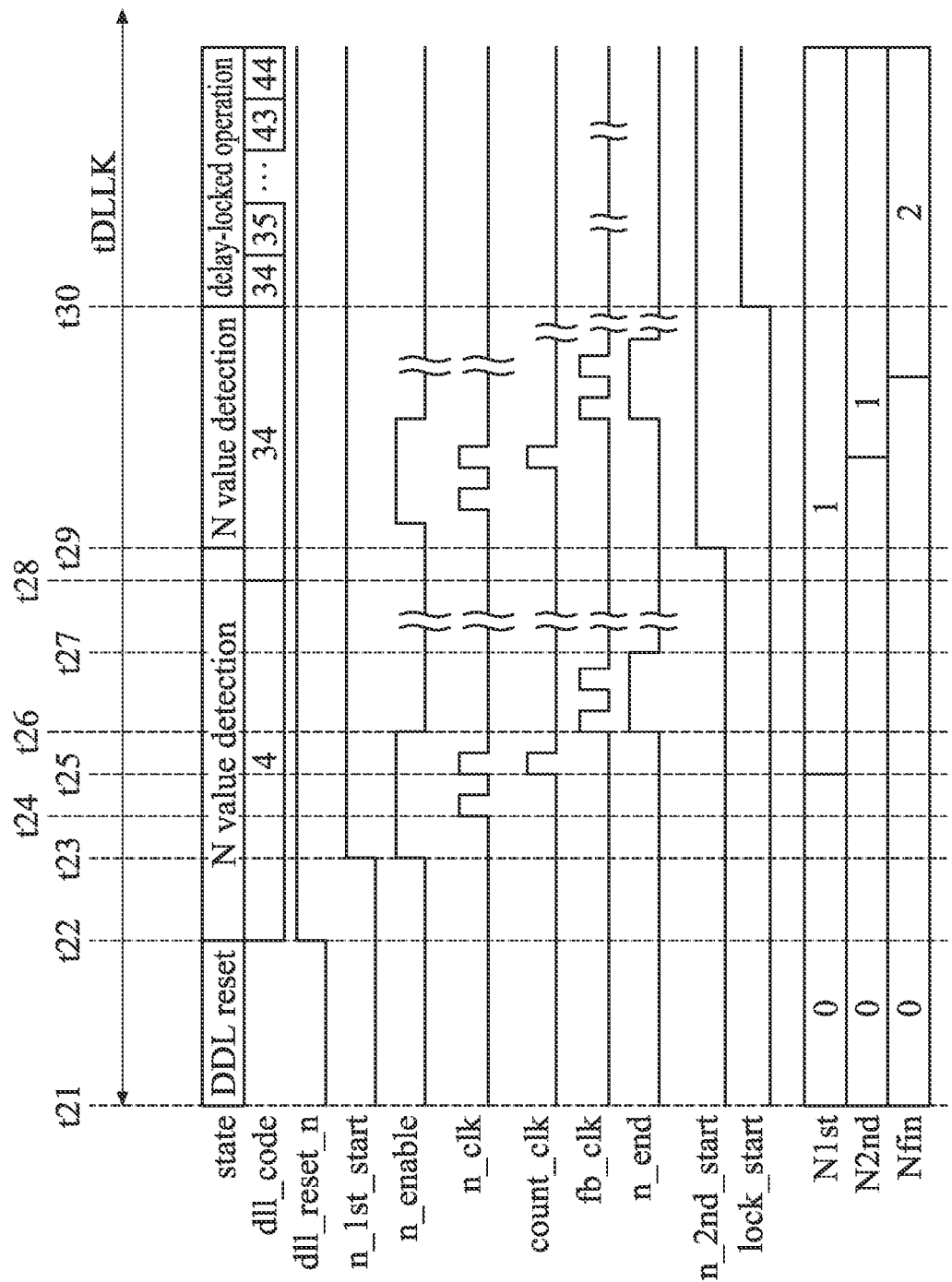
FIG. 6 is a schematic diagram showing transition timing of signal voltages of respective units in a control circuit in the first embodiment.

The control performed by the control circuit of this embodiment and the timing chart shown in FIG. 6 will be described. In the timing chart shown in FIG. 6, at time t21, a reset start signal (not shown) is input, and the reset state starts. The DLL reset state ends at time t22. Therefore, the N value detection unit 20 starts the first-time N value detection operation. At this time, the DLL control unit 13 sets the control signal dll_code as the reference delay amount "4".

At time t22, the reset signal dll_reset_n is switched to the high level. At time t23, in the N value detection unit 20, a start signal n_1st_start is generated at the high level. In addition, the first-time N value detection operation is actually started at time t23. However, in practice, since time t23 is immediately after time t22, it is considered that the N value detection operation starts from time t22 in the embodiment.

The start signal n_1st_start that is generated at the high level is input to the first one-shot circuit 211 of the signal n_clk generating unit 21, the start signal n_2nd_start with the low level is input to the second one-shot circuit 212, and the signal n_end with a low level is input to the third one-shot circuit 213. Thus, from time t23, the control signal n_enable output from the flip-flop circuit 215 is generated at the high level. By generating the control signal n_enable with the high level, from time t24, the clock signal that is generated only in the N value detection operation is the signal n_clk.

In the N value counting unit 22, since the control signal n_enable with the high level is input, the signal n_start (not shown in FIG. 6) with the high level is generated according to the signal n_clk that is input after time t24. On the other hand, at time t23, since the feedback clock signal (that is, the feedback signal fb_clk) with a low level is input to the second D-FF 222, the signal n_end with the low level is generated. In this way, the N value counting unit 22 is used to generate the high-level signal n_start and the low-level signal n_end. At time t25, the clock signal (that is, the signal count_clk) that corresponds to the N value and comprises pulses is output.

The signal count_clk is input to the fourth AND circuit 226 and the fifth AND circuit 228. In the fourth AND circuit 226, since the start signal n_1st_start with the high level is input, the pluses of the signal count_clk pass through the fourth AND circuit 226 based the AND operation and then are input to the first 4-bit counter 227. In the first 4-bit counter 227, each time when the pulses of the signal count_clk are input, the value of the first false N value signal N1st is increased once and then output as the first false N value signal N1st. In the embodiment shown in FIG. 6, during the first-time N value detection operation, the first false N value signal N1st is "1".

On the other hand, in the fifth AND circuit 228, since the start signal n_2nd_start with the low level is input, the second false N value signal N2nd maintain "0". The first false N value signal N1st and the second false N value signal N2nd are input to the DLL control unit 13.

Since the input first false N value signal N1st is "1", the DLL control unit 13 sets the control signal dll_code to be changed from the delay amount "34" according to the table shown in FIG. 3(A). At time t28, the control signal dll_code is set to the delay amount "34".

On the other hand, when the pulse of the feedback signal fb_clk, which is obtained by delaying the signal n_clk, is output from time t26, the signal n_end is switched to the high level from the low level at time t26 based on the operation of the in the N value counting unit 22. Thus, the control signal n_enable is switched to a low level at time 26 based on the operation of the signal n_clk generation unit 21. Since the signal n_end is switched to the high level from the low level, the start signal n_2nd_start is switched to the high level based on the operation of the second start signal generation unit 248 after a predetermined time starting from the rising edge of the signal n_end, that is, at time t29. In addition, since the control signal n_enable is switched to the low level at time t27, the signal n_end generated by the second D-FF 222 is also switched to the low level at time t27. Thus, after time t29, the N value detection unit 20 starts the second-time N value detection operation.

The N value detection operation is performed in the same manner as the first-time N value detection operation except that the start signal n_2nd_start is input at the high level, and the first false N value signal N1st is maintained at "1". In addition, the second false N value signal N2nd is also detected as "1". The first false N value signal N1st and the second false N value signal N2nd are input to the DLL control unit 13.

The DLL control unit 13 sets the initial delay amount during the delay-locked operation as "34" according to the first false N value signal N1st and the second false N value signal N2nd by referring to the table data shown in FIG. 3(B).

The first false N value signal N1st and the second false N value signal N2nd are input to the N value determination unit 23. Since the values of these signals are the same, the comparator 231 outputs "1". Then, the signal comp_out indicating "1" and the second false N value signal N2nd indicating "1" are input to the adder 232 for an addition operation, and the N value signal Nfin becomes "2".

When a signal lock_start with a high level is input at time t30 to start the delay-locked operation, the DLL control unit 13 inputs the control signal dll_code, which sets the initial delay amount as "34" for the delay-locked operation, to the delay line unit 14. Thus, the delay amount of the delay line unit 14 starts from "34", not from the reference delay amount "4". While performing the feedback control according to the feedback signal fb_clk, the DLL control unit 13 performs the delay-locked operation. When the delay amount during the delay-locked operation becomes "44", the input clock signal clk (not shown in FIG. 6) is synchronized with the feedback signal fb_clk, and the delay-locked operation ends.

In this embodiment, the initial delay amount of the delay-locked operation can be set greater according to the clock cycle tCK. Thus, compared with the prior art, the execution time of the delay-locked operation can be shortened. In this way, by preventing prolongation of the delay-lock operation, prolongation of the execution period of the whole procedure can be avoided so that the procedure can be terminated within a predetermined period (tDLLK). Accordingly, the DLL circuit 10 can return to the DLL control immediately after this procedure.

In the above-mentioned first embodiment, the N value detection operation are performed twice. The difference between the second embodiment and the first embodiment is that after the DLL is reset, the N value detection operation is performed twice before the delay-locked operation. However, if the first false N value is the same as the second false N value, the N value detection operation is performed again for the third time. Hereinafter, the difference between the second embodiment and the first embodiment is described.

Specifically, the above difference is described by referring to FIGS. 7-9(C). FIGS. 9(A)-9(C) shows the table data of the DLL control unit 13. As shown in FIG. 9(A), similar to the first embodiment, when the false N value is smaller, the delay amount is greater. In addition, with the N value detection operation performed twice or three times, the delay amount is set greater. As for the N value, if the first false N value is the same as the second false N value as shown in FIG. 9(C), the initial delay amount is based on the second false N value and the third false N value. In this case, when these values are smaller, the initial delay amount is set greater. In addition, if the first false N value is different from the second false N value, the reference delay amount is set as the initial delay amount as shown in FIG. 9(B), which is the same as the first embodiment.

Figure 7:
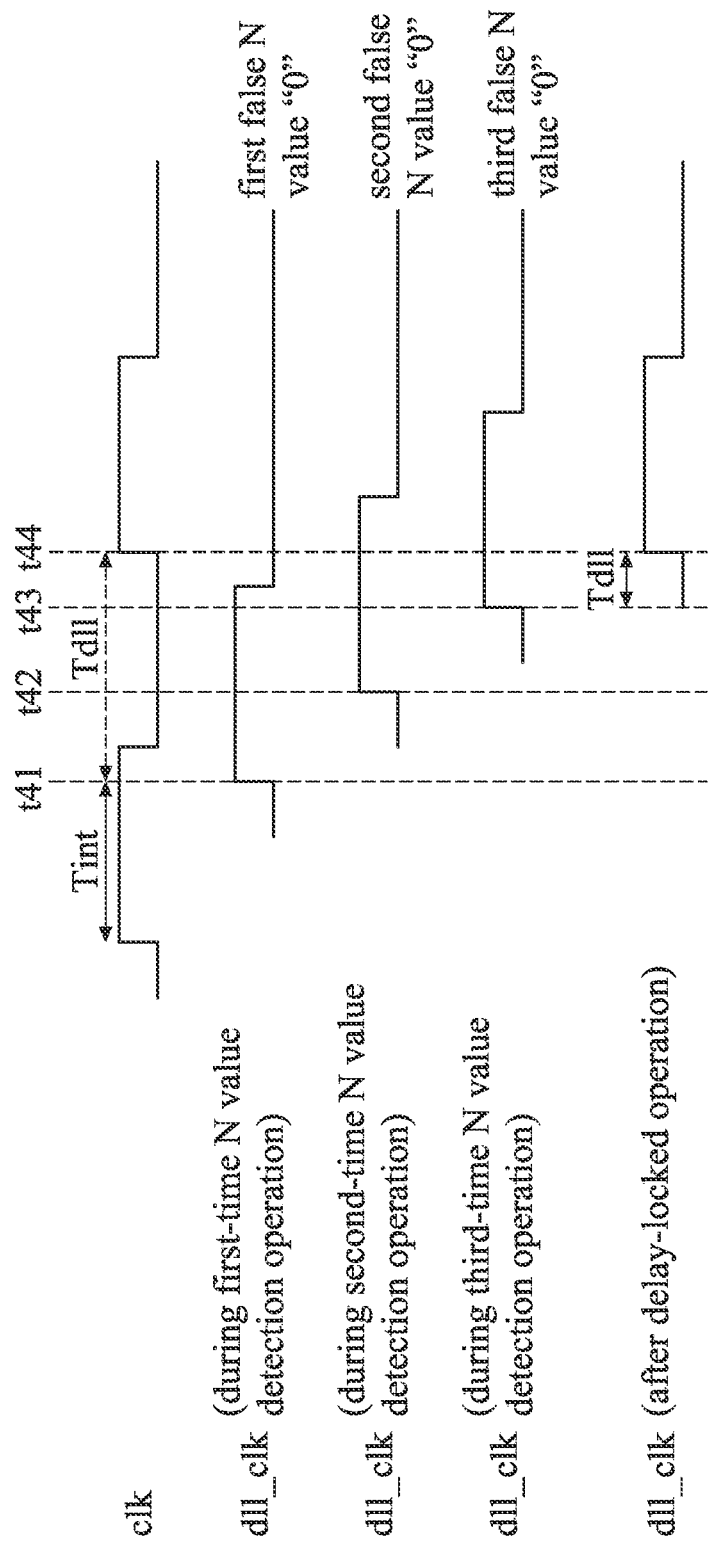
FIG. 7 is a schematic diagram showing relationship between an input clock signal and delay time in the second embodiment.
Figures 8A, 8B:
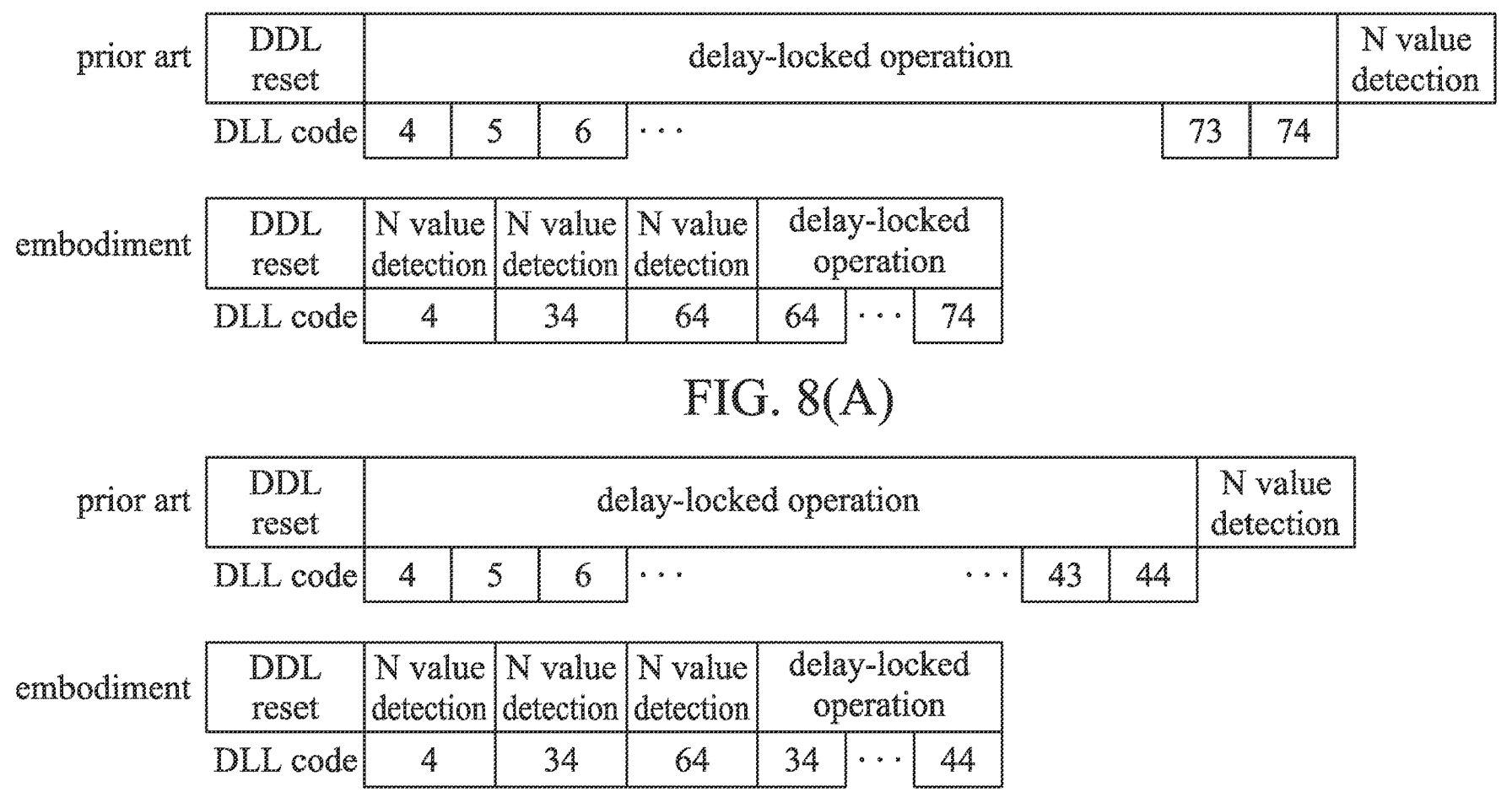

As shown in FIG. 7 and FIGS. 8(A) and 8(B), first, the delay amount of the delay line unit 14 during the first N value detection operation is the reference delay amount "4". In this state, the N value detection unit 20 performs the N value detection operation. Since the first false N value is "0", the DLL control unit 13 sets the delay amount as "34" for the N value detection operation according to the table data shown in FIG. 9(A), the second-time N value detection operation is performed based on this delay amount. Similarly, since the second false N value obtained in the second-time N value detection operation of the N value detection unit 20 is "0", the DLL control unit 13 decides to perform the N value detection operation for the third time. Then, the DLL control unit 13 sets the delay amount for the N value detection operation to "64" according to the table data shown in FIG. 9(A).

In the embodiment, the N value detection operation that is performed for the third time (referred to as "the third-time N value detection operation") is performed based on the delay amount "64", the third false N value, which is obtained in the third-time N value detection operation of the N value detection unit 20, is "0". The N value detection unit 20 takes "1" as the N value signal Nfin according to the first to third false N values and inputs it to the latency counter 30. In addition, since the first false N value is the same as the second false N value, the DLL control unit 13 sets the initial delay amount as "64" according to the second false N value and the third false N value by referring to the table data shown in FIG. 9(C). The delay-locked operation starts from the initial delay amount "64". When the delay amount becomes "74", the input clock signal is synchronized with the output clock signal, and the delay-locked operation ends.

In prior art, the locking time Tdll is the period from the rising edge of the output clock signal at time t41 during the first-time N value detection operation to the rising edge of the input clock signal clk at time t44. In the present embodiment of the present application, the locking time Tdll is the period from the rising edge of the output clock signal at time t43 during the third-time N value detection operation to the rising edge of the input clock signal clk at time t44. Therefore, the locking time of the embodiment is greatly reduced. In addition, in the case of the first embodiment, the locking time Tdll is the period from the rising edge of the delay signal dll_clk at time t42 during the second-time N value detection operation to the rising edge of the input clock signal clk at time t44. Therefore, compared with the first embodiment, the locking time of the present embodiment is also shortened.

If the first false N value is different from the second false N value, the N value detection operation is not performed for the third time. In this case, similar to the first embodiment, the DLL control unit 13 sets the initial delay amount as the reference delay amount. That is, in this case, the DLL control unit 13 sets the delay amount based on the table data shown in FIG. 9(B).

In addition, as shown in FIG. 9(C), when the first false N value is the same as the second false N value, but the second false N value is different from the third false N value, then the delay amount for the second-tine N value detection operation is set as the delay amount of the delay-locked operation.

Figure 10:
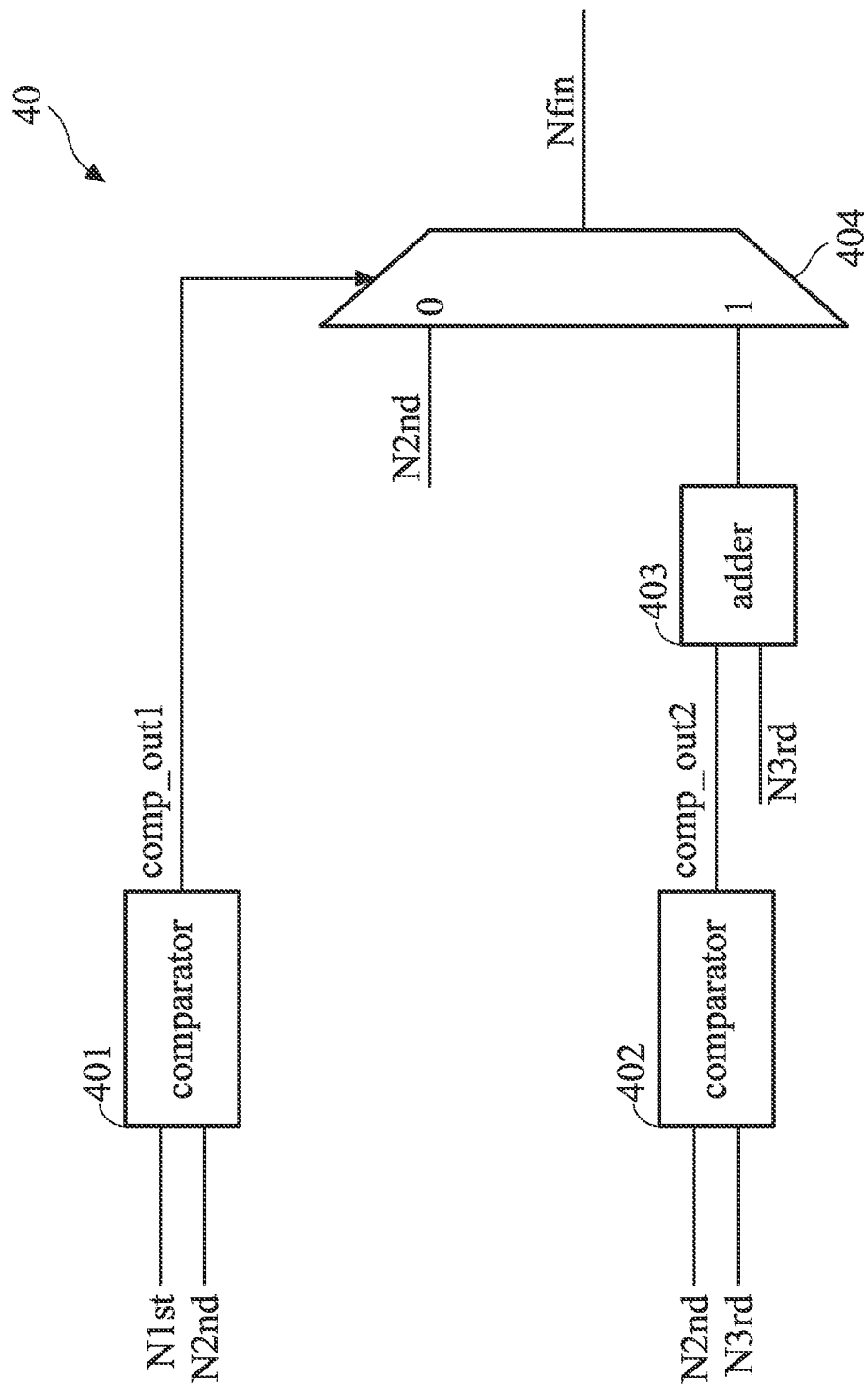
FIG. 10 is a schematic diagram showing a structure of a value N detection unit in the second embodiment.

In the embodiment, the N value counting unit 22 of the N value detection unit 20 can generate the 3rd false N value signal N3rd so that the N value detection unit 20 can perform the N value detection operation for the third time. In addition, the start signal generation unit 24 comprises a third start signal generation unit. The N value detection unit 20 comprises an N value determination unit 40 as shown in FIG. 10 instead of the N value determination unit 23. The N value determination unit 40 comprises comparators 401 and 402, an adder 403, and a multiplexer 404. The N value determination unit 40 determines the N value. The first false N value signal N1st and the second false N value signal N2nd are input to the comparator 401. Based on the operation of the comparator 401, if these signals are the same, the signal comp_out1 output from the comparator 401 is at a high level, and if the input signals are not the same, the signal comp_out1 output from the comparator 401 is at a low level. The signal comp_out1 is input to the multiplexer 404.

In addition, the second false N value signal N2nd and the third false N value signal N3rd are input to the comparator 402. Based on the operation of the comparator 402, if these signals are the same, the signal comp_out2 output from the comparator 402 is at a high level, and if the input signals are not the same, the signal comp_out2 output from the comparator 402 is at a low level. The signal comp_out2 is input to the adder 403. The third false N value signal N3rd is also input to the adder 403. The adder 403 performs an addition operation on the signal comp_out2 and the third false N value signal N3rd, and the output from the adder 403 is input to the multiplexer 404. That is, when the second false N value is equal to the third false N value, the adder 403 adds 1 to the third false N value and outputs it, and when the second false N value is not equal to the third false N value, the adder 403 outputs the third false N value. The output from the adder 403 and the second false N value signal N2nd are input to the multiplexer 404. When the signal comp_out1 indicates "1", the multiplexer 404 outputs the output from the adder 403 as the N value signal Nfin. In addition, when the signal comp_out1 indicates "0", the multiplexer 404 outputs the second false N value signal N2nd as the N value signal Nfin. The N-value signal Nfin is input to the latency counter 30.

In other words, in this embodiment, if all the false N values are the same, the last detected false N value (that is, the third false N value) plus 1 is taken as the N value. Then, if any one of these false N values is different from the others, the last detected false N value is taken as the N value. That is, if the first false N value is different from the second false N value, then the second false N value is set as the N value; if the first false N value is the same as the second false N value, but the second false N value is different from the third false N value, the third false N value is set as the N value.

Through such a configuration, in the embodiment, the false N value can be detected before the delay-locked operation, and there is no need to detect the N value after the delay-locked operation. Thus, prolongation of the delay-lock operation can be prevented, and the N value can be obtained at the same time. In addition, in the embodiment, if the first false N value is the same as the second false N value, the initial delay amount can be appropriately set even when the delay amount is relatively great by performing the N value detection operation three times. When the delay amount is not so greater, the initial delay amount can be also set appropriately.

In addition, if the first false N value is different from the second false N value, the N value detection operation will not be performed for the third time, however, the present invention is not limited thereto. If the first false N value is different from the second false N value, the N value detection operation can be performed for the third time. It is noted that, in this case, the third false N value detected by the third-time N value detection operation is not used to determine the N value and also not used to determine the delay amount for the delay-locked operation.

In the above embodiments, the N value detection operation is performed twice or three times, however, the present invention is not limited thereto. In addition, in order to set the delay amount more finely, it is preferred to perform the N value detection operations many times, however, which lengthens the period of the whole procedure. Therefore, it is preferred to perform the N value detection operation twice or three times.

In the above embodiments, when the reference delay amount is smaller, the delay amount is set to be greater than the reference delay according to the false N values, however, the present invention is not limited thereto. It is only necessary that the delay amount can be changed and set according to a plurality of false N values. For example, the reference delay amount can be set to be greater, and the delay amount may be subtracted from the reference delay amount according to the false N values. In addition, what the DLL control unit 13 sets may not be the initial delay amount. For example, the delay amount may be changed during the delay-locked operation. However, changing the initial delay amount can most effectively present the prolongation of the delay-lock operation.

The semiconductor memory device may also be a static random access memory (SRAM), a flash memory, or another semiconductor memory device.

Each of the Examples described above is described for easy understanding of the present invention, and is not described for limiting the present invention. Therefore, the elements disclosed in the above embodiments are intended to include all design changes or equivalents within the technical field of the present invention.

What is claimed is:

1. A control circuit comprising:
a control unit operating to set a delay amount;
a delay line unit operating to delay an input clock signal based on the delay amount and generate an output clock signal; and
a detection unit operating to perform a detection operation, wherein the detection operation is performed to detect a number of delayed clock cycles from the input clock signal to the output clock signal,
wherein the control unit changes the delay amount during a delay operation and controls the delay line unit so that the input clock signal is synchronized with the output clock signal,
wherein before the delay operation is performed, the detection unit performs the detection operation multiple times and detects a plurality of numbers of delayed clock cycles, and
wherein in response to the detection operation being performed multiple times, the control unit sets the delay amount for the detection operation and sets the delay amount for the delay operation according to the plurality detected numbers of delayed clock cycles.

2. The control circuit as claimed in claim 1, wherein the control unit changes an initial delay amount for the beginning of the delay operation according to the plurality of numbers of delayed clock cycles.

3. The control circuit as claimed in claim 1, wherein each time the detection operation is performed, the control unit sets the delay amount according to the number of delayed clock cycles that is detected in the detection operation.

4. The control circuit as claimed in claim 1, wherein in response to the plurality of numbers of delayed clock cycles being smaller, the control unit sets the delay amount to be greater.

5. The control circuit as claimed in claim 1, wherein each time the detection operation is performed, the control unit sets the delay amount to be greater than the delay amount set for the detection operation.

6. The control circuit as claimed in claim 1, wherein the delay amount corresponding to the number of delayed clock cycles is smaller than a maximum delay amount required to eliminate a predicted delay of the output clock signal relative to the input clock signal and determined in advance by the control unit.

7. The control circuit as claimed in claim 1, wherein:
the control unit determines whether the plurality of numbers of delayed clock cycles, which are detected when the detection operation is performed multiple times, are exactly the same, and
in response to the plurality of numbers of delayed clock cycles being exactly the same, the delay amount is set for the delay operation according to the number of delayed clock cycles during the detection operation that was performed last.

8. The control circuit as claimed in claim 1, wherein in response to the plurality of numbers of delayed clock cycles, which are detected when the detection operation is performed multiple times, being different from the others, the control unit sets the delay amount for the delay operation according to the number of delayed clock cycles that is detected during the detection operation performed before the last detection operation.

9. The control circuit as claimed in claim 1, wherein:
the detection operation is performed a predetermined number of times, and in response to the numbers of delayed clock cycles, which are detected when the detection operation is performed the predetermined number of times, being the same, the control unit performs the detection operation again, and
in response to the number of clock cycles that is detected by the last detection operation being the same as the number of delayed clock cycles, the control unit sets the delay amount for the delay operation according to the number of delayed clock cycles detected by the last detection operation.

10. The control circuit as claimed in claim 1, wherein the detection unit transmits the number of delayed clock cycles to a latency counter.

11. The control circuit as claimed in claim 10, wherein:
each time when the detection operation is performed, the delay amount is set according to the detected number of delayed clock cycles, and
in response to the plurality of numbers of delayed clock cycles detected based on the delay amount being exactly the same, the detection unit inputs the number of delayed clock cycles that is one more than the number of delayed clock cycles detected by the last detection operation to the latency counter.

12. The control circuit as claimed in claim 10, wherein:
each time when the detection operation is performed, the delay amount is set according to the number of delayed clock cycles, and
in response to one of records of the number of delayed clock cycles detected based on the delay amount being different from the others, the detection unit inputs the number of delayed clock cycles detected by the last detection operation to the latency counter.

13. The control circuit as claimed in claim 1, wherein after the delay operation, the control circuit does not perform the detection operation.

14. A semiconductor memory device comprising a control circuit, wherein the control circuit comprises:
a control unit operating to set a delay amount;
a delay line unit operating to delay an input clock signal based on the delay amount and generate an output clock signal; and
a detection unit operating to perform a detection operation, wherein the detection operation is performed to detect a number of delayed clock cycles from the input clock signal to the output clock signal,
wherein the control unit changes the delay amount during a delay operation and controls the delay line unit so that the input clock signal is synchronized with the output clock signal,
wherein before the delay operation is performed, the detection unit performs the detection operation multiple times and detects a plurality of the numbers of delayed clock cycles, and
wherein in response to the detection operation being performed multiple times, the control unit sets the delay amount for the detection operation and sets the delay amount for the delay operation according to the plurality of detected numbers of delayed clock cycles.

15. The semiconductor memory device as claimed in claim 14, wherein the semiconductor memory device is a dynamic random access memory.

* * * * *